(12) United States Patent
Seiller et al.

(10) Patent No.: US 10,480,779 B2
(45) Date of Patent: Nov. 19, 2019

(54) STEAM DUMP DEVICE FOR A NUCLEAR POWER PLANT

(71) Applicant: Alstom Technology Ltd, Baden (CH)

(72) Inventors: André Seiller, Levallois-Perret (FR);
Tan Thanh Vo, Levallois-Perret (FR)

(73) Assignee: General Electric Technology GmbH, Baden (CH)

( * ) Notice: Subject to any disclaimer, the term of this patent is extended or adjusted under 35 U.S.C. 154(b) by 713 days.

(21) Appl. No.: 15/177,403

(22) Filed: Jun. 9, 2016

(65) Prior Publication Data

US 2016/0363314 A1 Dec. 15, 2016

(30) Foreign Application Priority Data

Jun. 12, 2015 (EP) .................................... 15290158

(51) Int. Cl.
| | | |
|---|---|---|
| *F22B 35/04* | (2006.01) | |
| *F22G 5/12* | (2006.01) | |
| *F01K 9/00* | (2006.01) | |
| *G21D 3/04* | (2006.01) | |
| *F01K 9/04* | (2006.01) | |
| *F28B 9/02* | (2006.01) | |
| *F22B 37/00* | (2006.01) | |

(52) U.S. Cl.
CPC .............. *F22B 35/04* (2013.01); *F01K 9/003* (2013.01); *F01K 9/04* (2013.01); *F22G 5/12* (2013.01); *F22G 5/123* (2013.01); *F28B 9/02* (2013.01); *G21D 3/04* (2013.01); *F22B 37/002* (2013.01); *G21Y 2002/303* (2013.01); *G21Y 2002/50* (2013.01)

(58) Field of Classification Search
CPC ... F22G 5/123; F22G 5/12; F28B 9/02; F01K 9/003; F01K 9/04; F01K 9/00; F22B 35/04; F22B 37/002; G21D 3/04; G21Y 2002/303

See application file for complete search history.

(56) References Cited

U.S. PATENT DOCUMENTS

| | | | | |
|---|---|---|---|---|
| 3,195,871 | A | * 7/1965 | Prather | ..................... F01K 9/04 137/574 |
| 5,268,939 | A | 12/1993 | Tang et al. | |
| 6,189,871 | B1 | * 2/2001 | Schlageter | .............. F01K 3/002 261/118 |
| 8,770,155 | B2 | * 7/2014 | Tandra | ..................... F23J 3/023 122/405 |
| 9,593,598 | B2 | * 3/2017 | Bapat | ..................... F01K 17/04 |

(Continued)

FOREIGN PATENT DOCUMENTS

| | | | | |
|---|---|---|---|---|
| FR | 1446215 | A | * 7/1966 | ............... F01K 9/04 |
| JP | 57-49004 | | 3/1982 | |

(Continued)

OTHER PUBLICATIONS

Byeon: "Designing a Standard Thermal Power Plant for Daily Startup/Shutdown: The HP Bypass Control and Safety Funchtion" ISA, 1996 Paper #96-135.

*Primary Examiner* — Steven B McAllister
*Assistant Examiner* — Steven Anderson, II
(74) *Attorney, Agent, or Firm* — Cynthia W. Flanigan; GPO Global Patent Operation

(57) ABSTRACT

A nuclear power plant with a steam dump device and condenser for the nuclear power plant.

10 Claims, 7 Drawing Sheets

(56) References Cited

U.S. PATENT DOCUMENTS

| | | | | |
|---|---|---|---|---|
| 2004/0177613 | A1* | 9/2004 | DePenning | F01K 9/04 60/649 |
| 2009/0165878 | A1* | 7/2009 | Krakowski | B01F 3/02 137/896 |
| 2015/0020499 | A1 | 1/2015 | Watanabe et al. | |

FOREIGN PATENT DOCUMENTS

| | | | | |
|---|---|---|---|---|
| JP | 59009492 A | * | 1/1984 | F28B 9/02 |
| JP | 61-285386 | | 12/1986 | |

* cited by examiner

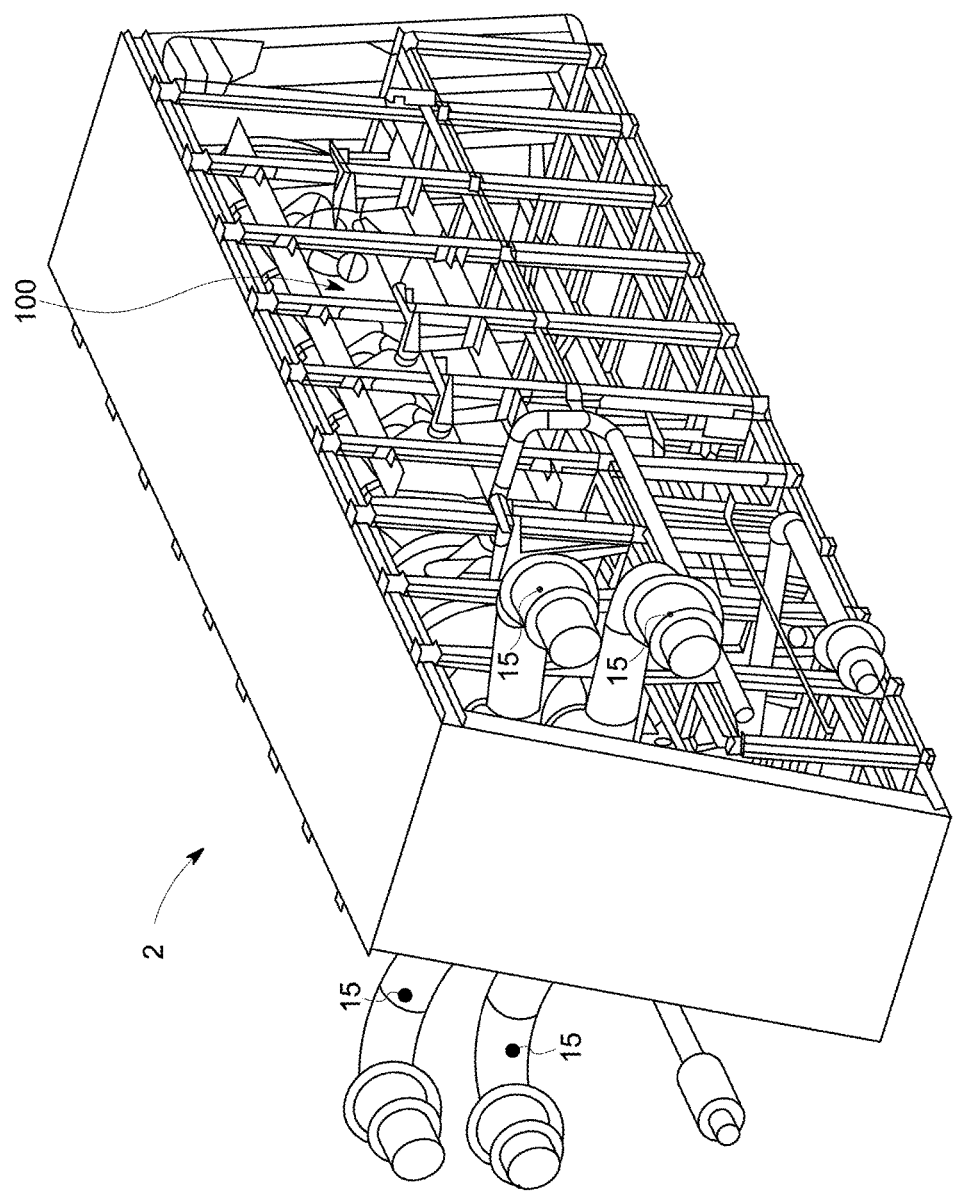

STEAM DUMP DEVICE FOR A NUCLEAR POWER PLANT

CROSS-REFERENCE TO RELATED APPLICATIONS

The present application claims foreign priority benefit under 35 U.S.C. § 119 to commonly-owned EP Patent Application No. 15290158.3 filed 12 Jun. 2015, which is hereby incorporated by reference in its entirety.

TECHNICAL FIELD

Embodiments of the present invention generally relates to a nuclear power plant, a steam dump device and a condenser for a nuclear power plant.

BACKGROUND

As well known, in a power plant a steam dump device is typically located downstream a bypass line arranged between the boiler and the condenser. Such bypass line is required, for example, during start-up or run-down operations of the plant where the steam has a high content of water which could damage the turbine blading.

The turbine bypass system hence permits start-up and rapid turbine load reductions, which includes turbine tripping, without causing a reactor trip or relief valve operation. The function of the dump steam diffusers is to breakdown the pressure of the dump steam in stages and to de-superheat it before it enters in the condenser.

To this purpose, the steam dump device permits the introduction of the steam into the condenser by operating a reduction of its temperature and the pressure values.

Generally, the steam dump device includes a vessel comprising means to reduce pressure and temperature of the steam and to efficiently guide the steam into the condenser.

U.S. Pat. No. 6,189,871, with reference to FIG. 1, discloses a partial external installation of a steam dump device 1 arranged on a bypass line connecting the boiler to the condenser 9. In particular, the steam dump device 1 includes a first perforated diaphragm 3, a cooling chamber 4 and a second perforated diaphragm 8.

The second perforated diaphragm 8 of the cooling chamber 4 projects into the condenser neck 7 of the condenser 9.

Patent publication JP61285386, with reference to FIG. 2, teaches a partially external installation steam dump device constituted in a double structure form including spray nozzles provided on the wall surface of the device.

Lastly, patent publication JP57049004 discloses a steam dump device, depicted in FIG. 3, having a configuration aiming to prevent a internal protection of a barrel body of a condenser caused by in-flow of bypassing steam, wherein a cooling means is arranged in a turbine bypass inlet pipe as a double pipe structure near an open end of the condenser of a turbine bypass pipe.

However, solutions above illustrated still don't provide an optimum efficiency in terms of properly guiding the steam into the condenser avoiding damages of the condenser neck due to vibration and/or thermal expansion and large flow of nuclear power plants.

SUMMARY

It is an object of the present invention to solve the aforementioned technical problems by providing a steam dump device for a nuclear power plant, configured to be installed within a bypass line leading from a boiler to a condenser comprising an elongated header vessel comprising a means for receiving steam, said elongated vessel extending horizontally and comprising a top perforated diaphragm and a bottom perforated diaphragm opposed thereto, said top and bottom perforated diaphragms arranged on respective top and bottom portions on a wall of the header vessel; external baffle plates assembly partially enclosing said header vessel and comprising a top plate and a bottom plate, said baffle plates assembly defining lateral steam openings.

Moreover, a further object of the present invention is to provide a condenser.

According to an aspect of the invention, this object is obtained by a steam dump device for a nuclear power plant, configured to be installed within a bypass line leading from a boiler to a condenser and comprising an elongated header vessel comprising a means for receiving steam, wherein the elongated vessel extends horizontally and comprises a top perforated diaphragm and a bottom perforated diaphragm opposed thereto, the top and bottom perforated diaphragms being arranged on respective portions on a wall of the vessel; an external baffle plates assembly partially enclosing the header vessel and comprising a top plate and a bottom plate, the baffle plates assembly defining lateral steam openings.

According to an aspect of the invention, the top perforated diaphragm has a greater area than the bottom perforated diaphragm.

According to an aspect of the invention, the ratio between the areas of the top diaphragm versus the bottom one is comprised within a range from 1:1, (i.e., the areas are equal to each other) to 4:1 (i.e., the top area is four times greater than the bottom area).

More particularly, the ratio is substantially equal to 2:1 (i.e., the top area is twice as large).

According to an aspect of the invention, wherein the header vessel comprises a couple of consecutive and separated top perforated diaphragms arranged along the top portion of the lateral wall of the vessel, and a couple of consecutive and separated bottom perforated diaphragms arranged along the bottom portion of the wall.

According to an aspect of the invention, the header vessel comprises elliptical terminal heads at both ends.

According to an aspect of the invention, the means for receiving steam comprises one or more steam inlets arranged upstream of one of the elliptical terminal heads and is configured to be connected to a steam pipe, the steam inlet comprising a multi holed hemispherical head.

According to an aspect of the invention, the steam dump device further comprises spray nozzles arranged along the baffle plates assembly.

According to an aspect of the invention, the steam dump device comprises sliding support feet configured to allow a longitudinal movement of the vessel on a supporting structure.

According to a further aspect of the invention, it is provided a condenser for a nuclear power plant, which comprises one or more steam dump devices according to the present invention, each steam dump device being located inside the condenser.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which:

FIGS. 7 and 8 depict respectively a lateral and a perspective view of a condenser according to an embodiment the present invention.

The embodiments will be now described in detail with reference to the above referenced drawings.

DETAILED DESCRIPTION

Figure 1:
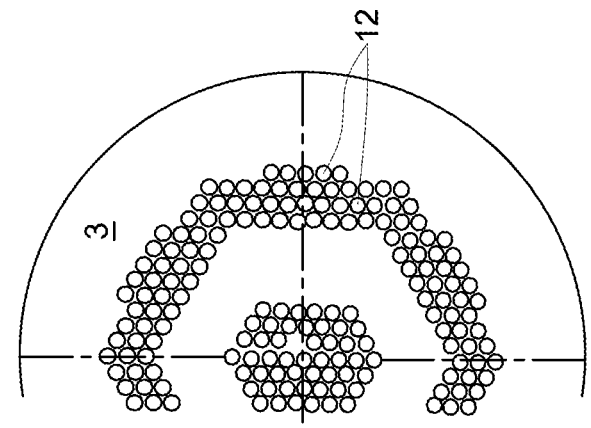
FIGS. 1, 2 and 3 show different steam dump device arrangements according to prior art.
Figure 1:
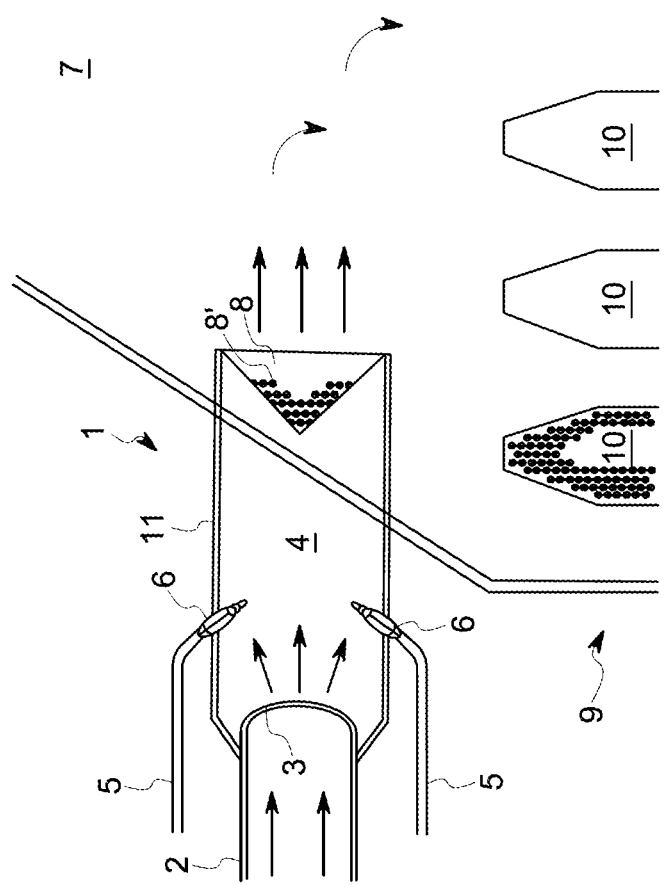
Figure 2:
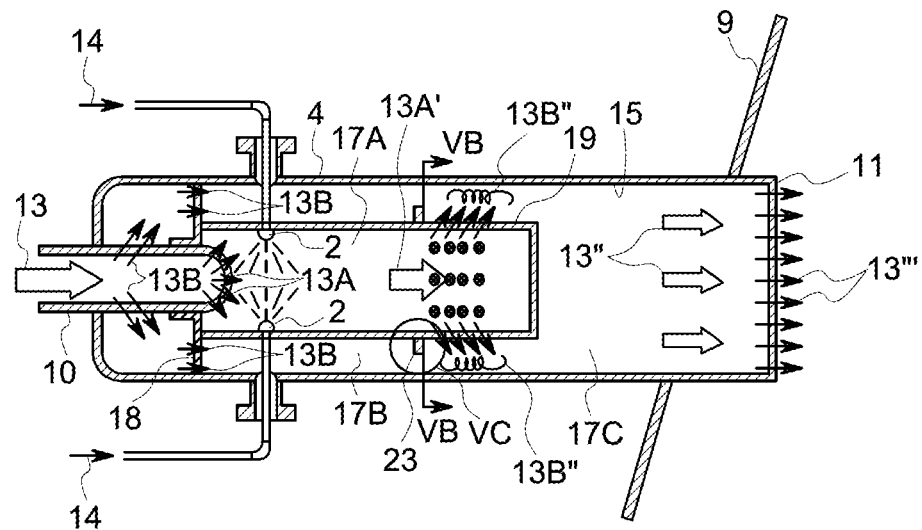
Figure 3:
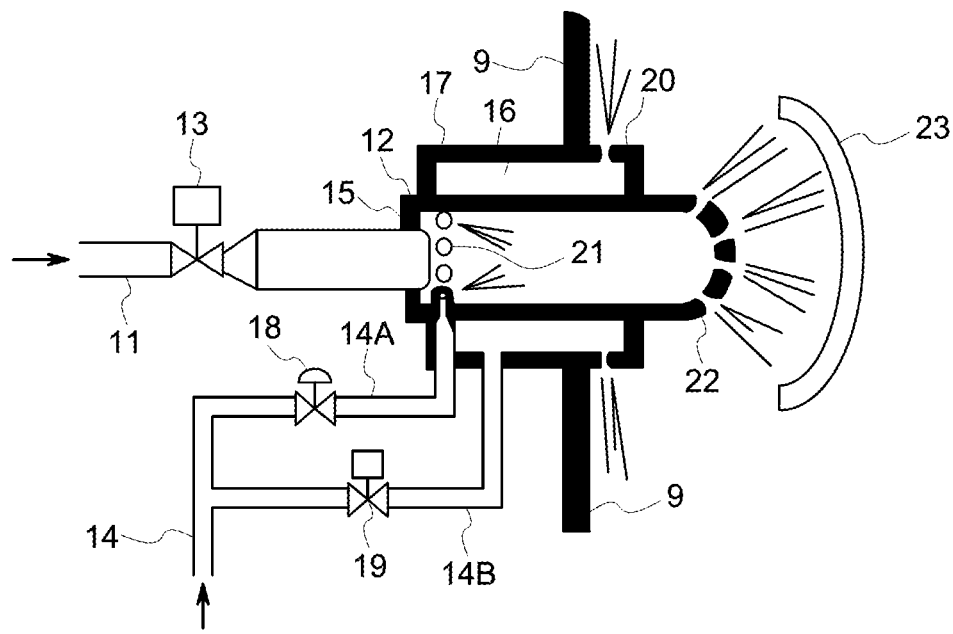
Figure 4:
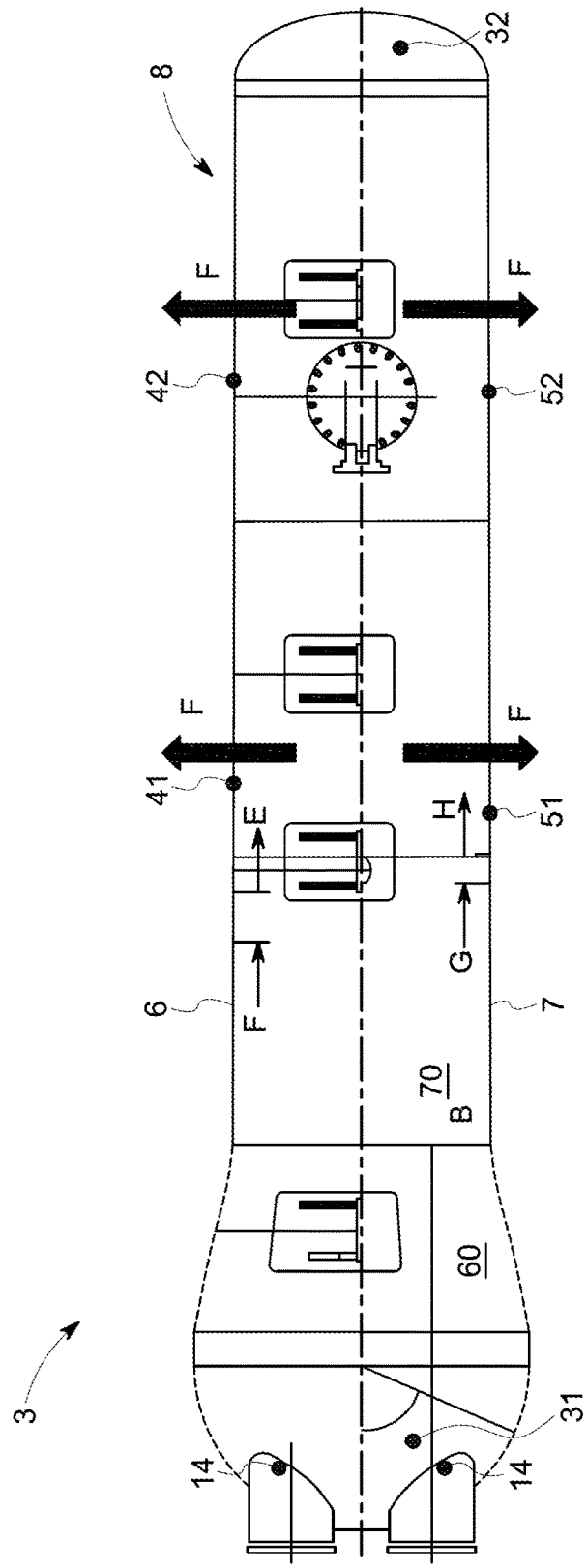
FIG. 4 shows a lateral view of a header vessel forming part of a steam dump device according to an embodiment of the present invention.

With reference to FIG. 4, it is shown a lateral view of a header vessel 3, which forms part of a steam dump device according to an embodiment of the present invention (not shown in the figure). The header vessel 3 is configured to be installed along a bypass line (not shown) leading from a boiler to a condenser and is particularly designed to cool off a steam being diverted from the boiler to the condenser without evolving in a turbine to produce useful work. Such bypass line may be used, as mentioned above, during start-up or run-down of the plant or in case, during normal operation, a problem with the turbine might occur which would require the steam to bypass the turbine stage.

More in particular, header vessel 3 presents an elongated shape extending horizontally within a supporting structure (not shown). In an embodiment, the header vessel 3 has a substantially cylindrical shape having elliptical terminal heads 31, 32 at both of its end. Means 14 for receiving steam, more particularly, in the form of a steam inlet 14, is located at an upwards terminal elliptical head 31. In an embodiment herein disclosed, header vessel comprises four steam inlets 14 (only two visible in the view of FIG. 4), but it may be appreciated that number of inlets 14 may be only one or more. Each steam inlet 14 is adapted to be connected to a steam pipe (not shown) of the bypass line. The hot steam reaching the header vessel 3 goes through a first chamber 60, having convergent external walls, and then arrives in a second chamber 70, having a wall 8. Cooling chamber 70 comprises a top perforated diaphragm 41 and a bottom perforated diaphragm 51 opposed thereto, arranged on respective top and bottom portions 6, 7 of the wall 8. More particularly, header vessel 3 comprises a further top perforated diaphragm 42, arranged on the top portion 6 of the wall 8, the top perforated diaphragm 42 being subsequent to and separated from the perforated diaphragm 41. Similarly, header vessel 3 comprises a further bottom perforated diaphragm 52, arranged on the bottom portion 7 of the wall 8, the bottom perforated diaphragm 52 being subsequent to and separated from the perforated diaphragm 51. Top and bottom perforated diaphragms 42 and 52 are located opposed to each other in a similar way as for perforated diaphragms 41 and 51.

The steam reaching second chamber 70 is expelled from the vessel 3 through perforated diaphragms, hence along a vertical direction indicated by arrows F.

Making now reference to next FIG. 5, it is shown (above) a top view of the header vessel 3 and (below) a bottom view of the same.

In the top view, top perforated diaphragms 41 and 42 are visible, which are located on the top portion 6 of the wall 8 of the header vessel 3.

In the bottom view, bottom perforated diaphragms 51 and 52 are visible, which are located on the bottom portion 7 of the wall 8 of the header vessel 3.

In particular, it has been found that a remarkable efficiency in the cooling process of the steam is achievable when top diaphragms 41 and 42 have a greater area than correspondent bottom perforated diaphragms 51 and 52. In particular, it has been found that maximum efficiency is reached with a ratio of 1:2 between areas of opposed top and bottom perforated diaphragms 41, 51 and 42, 52, meaning that the top diaphragm has an area which is substantially two times greater than the bottom one. However, important effects are still achieved with said ratio comprised within an interval from 1:1 to 1:4.

Perforated diaphragms may be constituted by a plate having drilled orifices, from which steam pressure can fall down while exiting the vessel 3.

Figure 5:
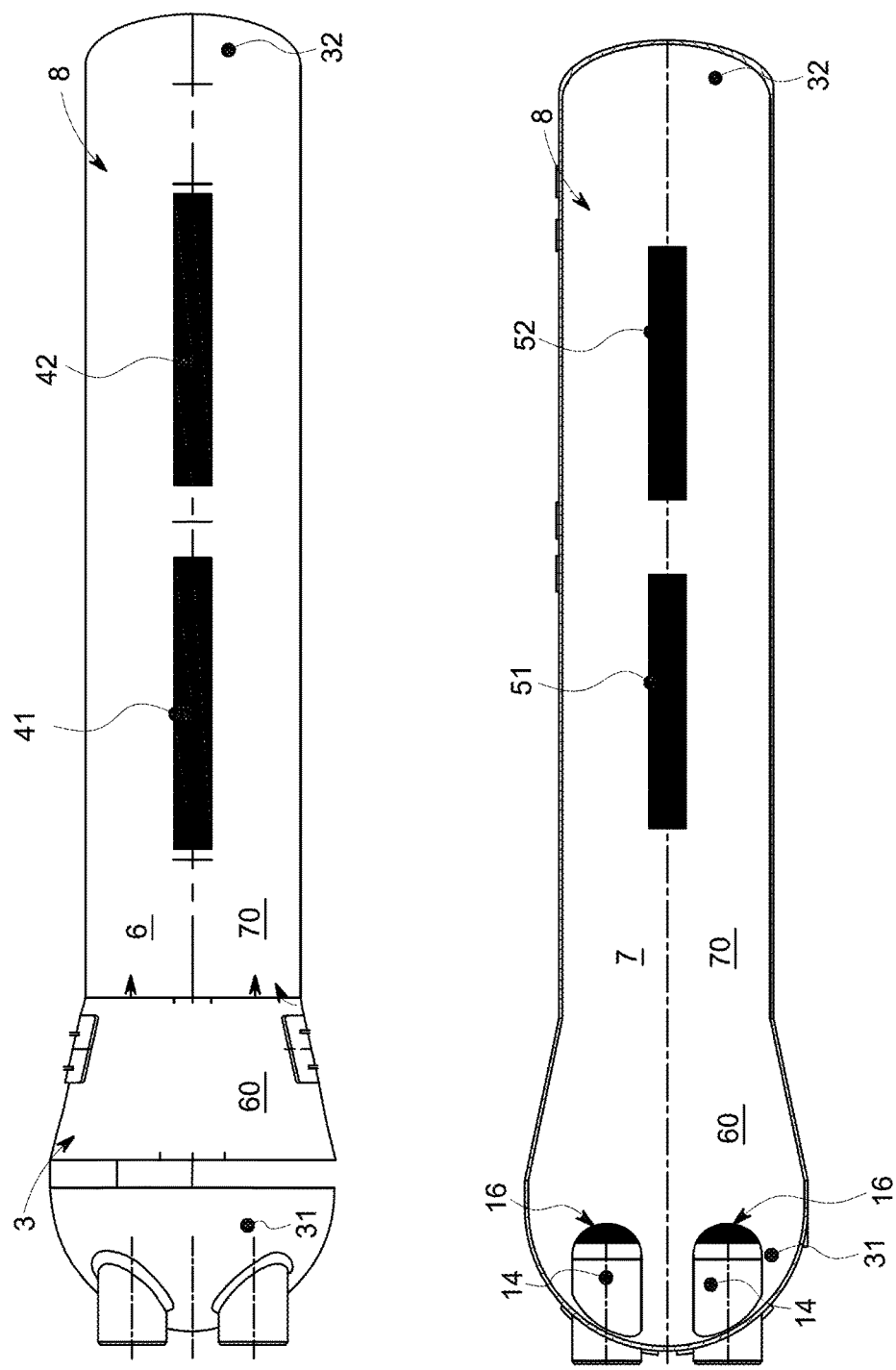
FIG. 5 shows a top and bottom views of the header vessel of FIG. 4.

Still with reference to FIG. 5 bottom view, each steam inlet 14 comprises a multi holed hemispherical head 16, through which the steam is directed when entering in the first cooling chamber 60.

Multi holed hemispherical heads 16 in the first chamber 60 may be considered as a primary orifice stage of the vessel, while the perforated diaphragms 41, 42, 51, 52 arranged on the wall 8 in the second chamber 70 may be considered as a secondary orifice stage of the vessel.

Figure 6:
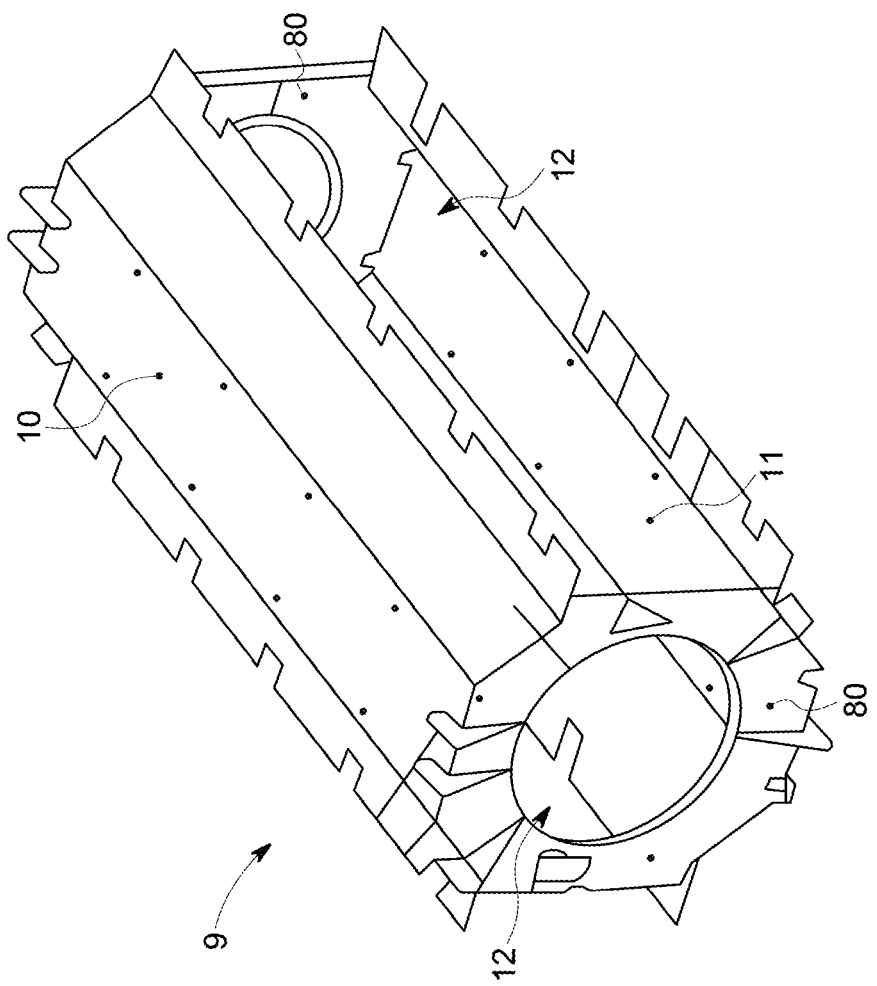
FIG. 6 shows a perspective view of a baffle plate assembly enclosing the header vessel of FIGS. 4 and 5.

With reference to next FIG. 6, it is depicted an external baffle plates assembly 9, forming part of the steam dump device according to an embodiment of the invention (not shown in its entirety), which partially encloses the header vessel illustrated in preceding FIGS. 4-5.

Baffle plates assembly 9 includes a top plate 10, a bottom plate 11 and opposed closing plates 80 and defines lateral steam openings 12. The vessel is located within the baffle plates assembly and the steam, after having passed through top and bottom perforated diaphragms, reaches top and bottom plates 10, 11 of the baffle plates assembly 9. Then, it is diverted by the baffle plates assembly towards the sides, and reaches the condenser through the lateral steam openings 12. Additionally, to further improve the cooling process, spray nozzles may be arranged along top and bottom baffle plates 10 and 11. More in particular, according to an embodiment, four pipes (not shown) are arranged within the top and bottom plates 10, 11, two within the top baffle plate 10 and two within the bottom baffle plate 11. A bolted blind flange shut their extremity. Spray nozzles are positioned along each pipe at regular intervals to inject condensate into the main steam coming from the secondary orifice stage of the header vessel.

Figure 7:
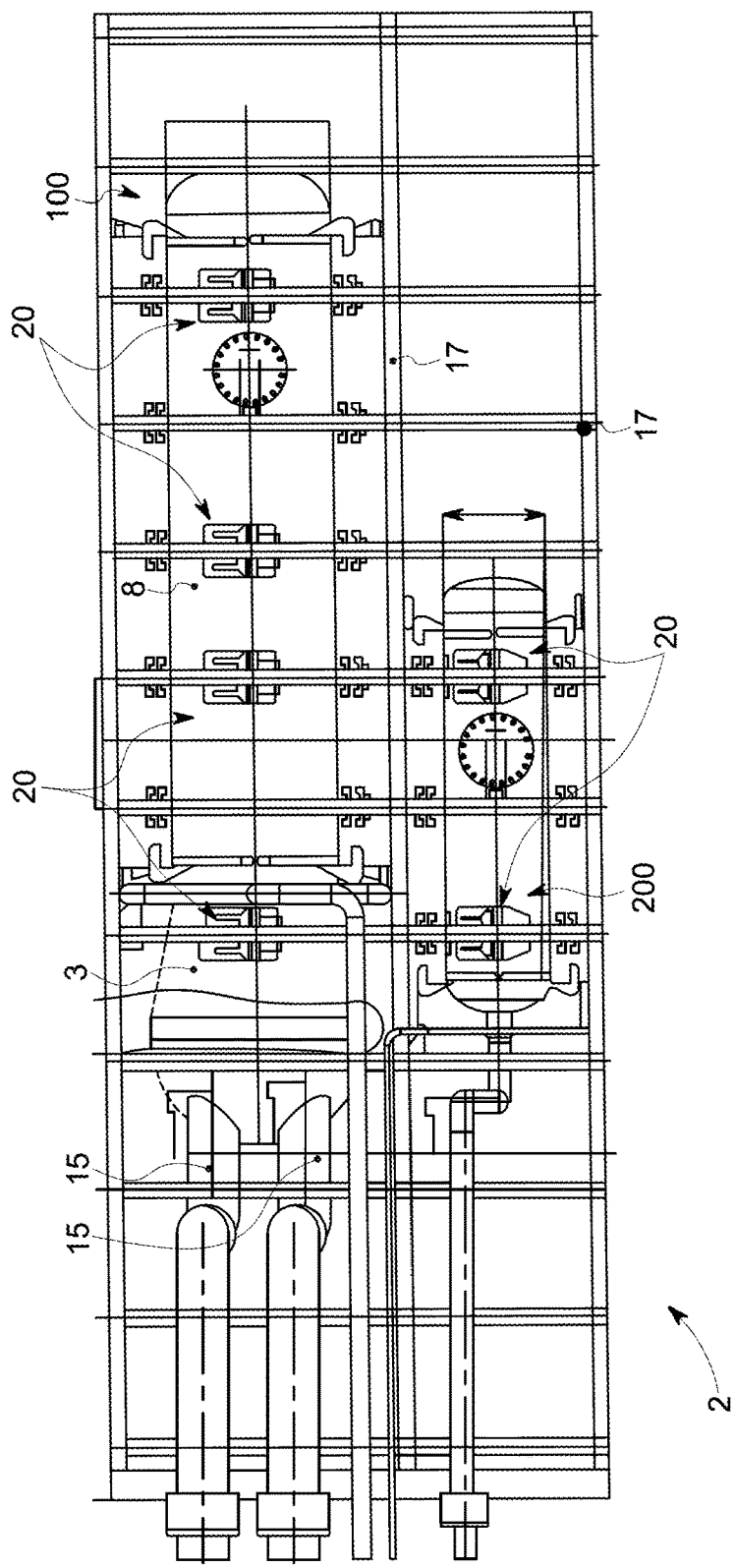

With reference to FIGS. 7 and 8, it is shown a condenser 2, more particularly an inside structure thereof, respectively in a lateral and perspective view, which comprises a primary steam dump device 100 and a secondary steam dump device 200. In particular, the primary steam dump device 100 may be used during normal operation of the power plant, in case of any need of bypassing the turbine stage, while the secondary steam dump device 200 may be used during start-up or and/or run down of the machinery. However, it will be appreciated that primary and secondary steam dump devices are equal to each other expect for the fact that the first one may accept and elaborate a greater flow of steam with respect to the second one. It may as well be appreciated that condenser 2 may also be provided with only one steam dump device according to an embodiment of the invention.

Primary and secondary steam dump devices 100 and 200 are located inside the condenser 2.

Reference will be made to primary steam dump device 100, but it will be appreciated that same disclosure is applicable, mutatis mutandis, to the secondary steam dump device 200.

Steam reaches steam dump device 100 by means of inlet pipes 15 which pass through a condenser wall, and enters the header vessel 3 and subsequently is expelled within the condenser through lateral openings defined by the baffle plates assembly 9, enclosing the header vessel 3.

Furthermore, an embodiment of the steam dump device comprises sliding support feet 20 which are configured to allow a longitudinal movement (due to thermal expansion and contraction) of the header vessel 3 on a supporting structure 17, while blocking the vertical one. More particularly, an inspection cover is bolted to a manhole on the side of the header vessel.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A steam dump device for a nuclear power plant, configured to be installed within a bypass line leading from a boiler to a condenser comprising:
    an elongated header vessel comprising a means for receiving steam, the elongated header vessel extending horizontally and comprising at least a top perforated diaphragm and at least a bottom perforated diaphragm opposed thereto, said top and bottom perforated diaphragms arranged on respective top and bottom portions of the elongated header vessel, the top perforated diaphragm having a greater area than the bottom perforated diaphragm area; and
    an external baffle plate assembly partially enclosing the elongated header vessel the external baffle plate assembly comprising a top plate and a bottom plate, wherein each of the top and bottom plates comprises lateral steam openings along the length of the plate.

2. The steam dump device of claim 1, wherein a ratio between the areas of said top perforated diaphragm and said bottom perforated diaphragm is comprised within a ratio of 1:1 to 4:1.

3. The steam dump device of claim 2, wherein said ratio is equal to 2:1.

4. The steam dump device of claim 1, comprising a plurality of consecutive and separated top perforated diaphragms arranged along the top portion of the elongated header vessel, and a plurality of consecutive and separated bottom perforated diaphragms arranged along the bottom portion of the elongated header vessel.

5. The steam dump device of claim 1, wherein the elongated header vessel comprises an elliptical terminal head at both ends.

6. The steam dump device of claim 5, wherein at least one elliptical terminal head comprises at least one steam inlet and a multi holed hemispherical diaphragm.

7. The steam dump device of claim 1, further comprising sliding support feet configured to allow a longitudinal movement of the elongated header vessel on a supporting structure.

8. A condenser of a nuclear power plant, comprising at least one or more steam dump devices according to claim 1, wherein each steam dump device is located inside the condenser.

9. The steam dump device of claim 1, wherein the elongated header vessel comprises a primary orifice stage and a secondary orifice stage.

10. The steam dump device of claim 9, wherein the primary orifice stage comprises a multi-holed hemispherical diaphragm and the secondary orifice stage comprises at least a top perforated diaphragm and at least a bottom perforated diaphragm.

* * * * *